(12) United States Patent
Sihlbom et al.

(10) Patent No.: US 6,667,636 B2
(45) Date of Patent: Dec. 23, 2003

(54) DSP INTEGRATED WITH PROGRAMMABLE LOGIC BASED ACCELERATORS

(75) Inventors: Bjorn Sihlbom, Palo Alto, CA (US); Neal S. Stollon, Dallas, TX (US); Thomas McCaughey, Mountain View, CA (US)

(73) Assignee: LSI Logic Corporation, Milpitas, CA (US)

( * ) Notice: Subject to any disclaimer, the term of this patent is extended or adjusted under 35 U.S.C. 154(b) by 31 days.

(21) Appl. No.: 10/047,616

(22) Filed: Jan. 16, 2002

(65) Prior Publication Data

US 2002/0186043 A1 Dec. 12, 2002

Related U.S. Application Data

(60) Provisional application No. 60/297,586, filed on Jun. 11, 2001.

(51) Int. Cl.[7] .................. H03K 19/177; G06F 15/76
(52) U.S. Cl. ....................... 326/41; 326/101; 712/35
(58) Field of Search ................ 326/37–41, 44, 326/47, 101; 712/10, 15, 32, 35

(56) References Cited

U.S. PATENT DOCUMENTS

| | | | | |
|---|---|---|---|---|
| 5,603,043 A | * | 2/1997 | Taylor et al. | 712/1 |
| 6,272,451 B1 | * | 8/2001 | Mason et al. | 703/13 |
| 6,538,470 B1 | * | 3/2003 | Langhammer et al. | 326/41 |

* cited by examiner

Primary Examiner—James H Cho
(74) Attorney, Agent, or Firm—Conley Rose

(57) ABSTRACT

A heterogeneous integrated circuit having a digital signal processor and at least one programmable logic core. An AMBA AHB couples the cores and most other functional units on the IC. The PLCs are also coupled to the DSP through a separate DMA sharing unit to the DSP, and particularly to the DSP memory. The memory sharing arrangement provides a separate high-speed data transfer mechanism between the PLCs and the DSP. The AMBA AHB allows the DSP to control the PLC operations without interference with high-speed data transfers.

13 Claims, 4 Drawing Sheets

DSP INTEGRATED WITH PROGRAMMABLE LOGIC BASED ACCELERATORS

CROSS-REFERENCE TO RELATED APPLICATIONS

The present application claims priority from provisional U.S. patent application Ser. No. 60/297,586, entitled "A Multi-Core Architecture For Flexible Broadband Processing", filed on Jun. 11, 2001, by the present inventors.

BACKGROUND OF THE INVENTION

The present invention relates to multi-core system-on-a-chip integrated circuits, and more particularly to heterogeneous integrated circuits having both arithmetic cores and programmable bit level logic cores.

Wireless, imaging and broadband communications processing systems commonly use both signal and logical processing operations. Architectures suited to one type of processing are typically not suited or appropriate for the other. General-purpose architectures are limited both in flexibility and efficiency for digital signal processor, DSP, operations. DSP architectures, developed for arithmetic operations, are not optimal in functions with extensive bit level manipulations. Heterogeneous architectures, that is integrated circuits having both types of cores, provide one solution to this tradeoff.

For example, in a wireless communications system, the transmitted signals are normally encoded with error protection codes. When such signals are received, they must first be decoded to recover the transmitted information. Decoding is a bit level process. The decoded or recovered signal is processed by various arithmetic algorithms, e.g. for echo cancellation. Such arithmetic operations are best performed in DSPs.

The tradeoffs are further complicated by the fact that algorithms and standards in many emerging areas of signal processing, especially communications, are evolving. That is, new algorithms are being developed to meet new standards and it is desirable to update systems as soon as possible. In addition, it is desirable that both bit level and DSP processing operations be flexible so that different algorithms may be used for different signal streams which pass through the same system or for the same signal streams at different times. This diversity of processing and need for flexibility and reconfigurability of operation make fully programmable systems attractive to system designers.

SUMMARY OF THE INVENTION

In accordance with the present invention, an integrated circuit includes a digital signal processor, at least one programmable logic core, shared memory and a memory bus system coupling the digital signal processor and programmable logic core to the memory and to each other. The bus system provides simplified high-speed data transfer between the programmable logic core and the digital signal processor.

In a preferred embodiment, the integrated circuit includes at least two programmable logic cores. With two programmable logic cores, both preprocessing and post-processing can be provided to accelerate system operation.

DETAILED DESCRIPTION OF EMBODIMENTS

Figure 1:
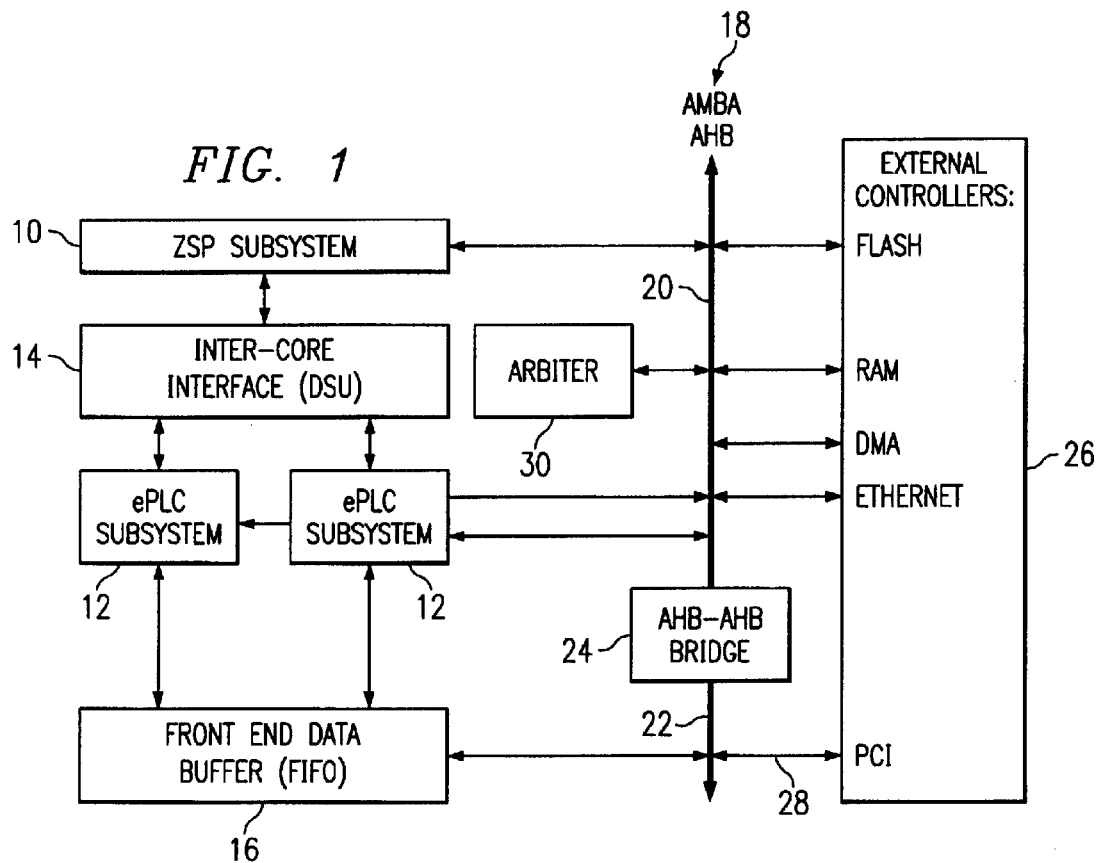
FIG. 1 is a general block diagram of a heterogeneous integrated circuit embodiment of the present invention.

With reference to FIG. 1, the basic structure of a heterogeneous integrated circuit embodiment of the present invention will be described The system includes a digital signal processor subsystem, DSP, 10 and two programmable logic cores, PLCs, 12. In this embodiment, the DSP 10 is a ZSP400 core (ZSP) and its local memory subsystem. The ZSP400 is a 4-way superscalar, 16-bit DSP core developed by LSI Logic Corporation. The ZSP architecture is based on a 5-stage pipeline. The PLCs 12, also referred to as ePLCs, are RTL programmable logic core resources developed specifically for embedded applications. The ePLC architecture is developed by Adaptive Silicon Inc. The PLCs provide a user configurable logic processing resource in the system of FIG. 1. Two PLCs are included in this embodiment, both to provide flexible configuration of programmable resources (for example to provide both pre and post processing relative to DSP 10) and to allow for reconfigurable operations, such as one PLC 10 being reprogrammed while the other is operating on data. Depending on the application, only one PLC 12 may be implemented in the system.

The FIG. 1 system also includes an inter-core interface, or direct memory access, DMA, sharing unit, DSU 14 connected between the DSP 10 and the PLCs 12. The DSU 14 provides high speed data transfers between the DSP 10 and the PLCs 14. The DSU 14 may be considered to be a dedicated high speed data bus.

A front end data buffer, FEB, 16 is provided for receiving data from external sources and coupling the data to PLCs 12 and through PLCs 12 and DSU 14 to the DSP 10. The FEB 16 operates on a first-in-first-out, FIFO, basis.

The system also includes an common interface bus system 18, in this embodiment an Advanced Microcontroller Bus Architecture (AMBA) Advanced High-performance Bus (AHB) bus system. The AMBA AHB system was developed by ARM Limited and has been accepted by many integrated circuit manufacturers as a standard on-chip bus. As a result, many cores are designed with an AMBA AHB port, which simplifies interconnection of cores in an integrated circuit like the system shown in FIG. 1.

In this embodiment, the bus is divided into two sections 20 and 22 coupled by a bridge 24. The section 20 couples on-chip cores and subsystems, e.g. DSP10, PLCs 12 and DSU 14, and external controllers 26. The section 22 couples the FEB 16 to an external source of high speed signals or data such as a PCI bus 28. By splitting the bus into two parts 20 and 22, interference between the high bandwidth signals on section 22 and the slower control signals on section 20 is avoided. The bridge 24 provides a link which couples signals between the two bus sections. The bus 18 also includes an arbiter 30 for controlling bus operation.

Figure 2:
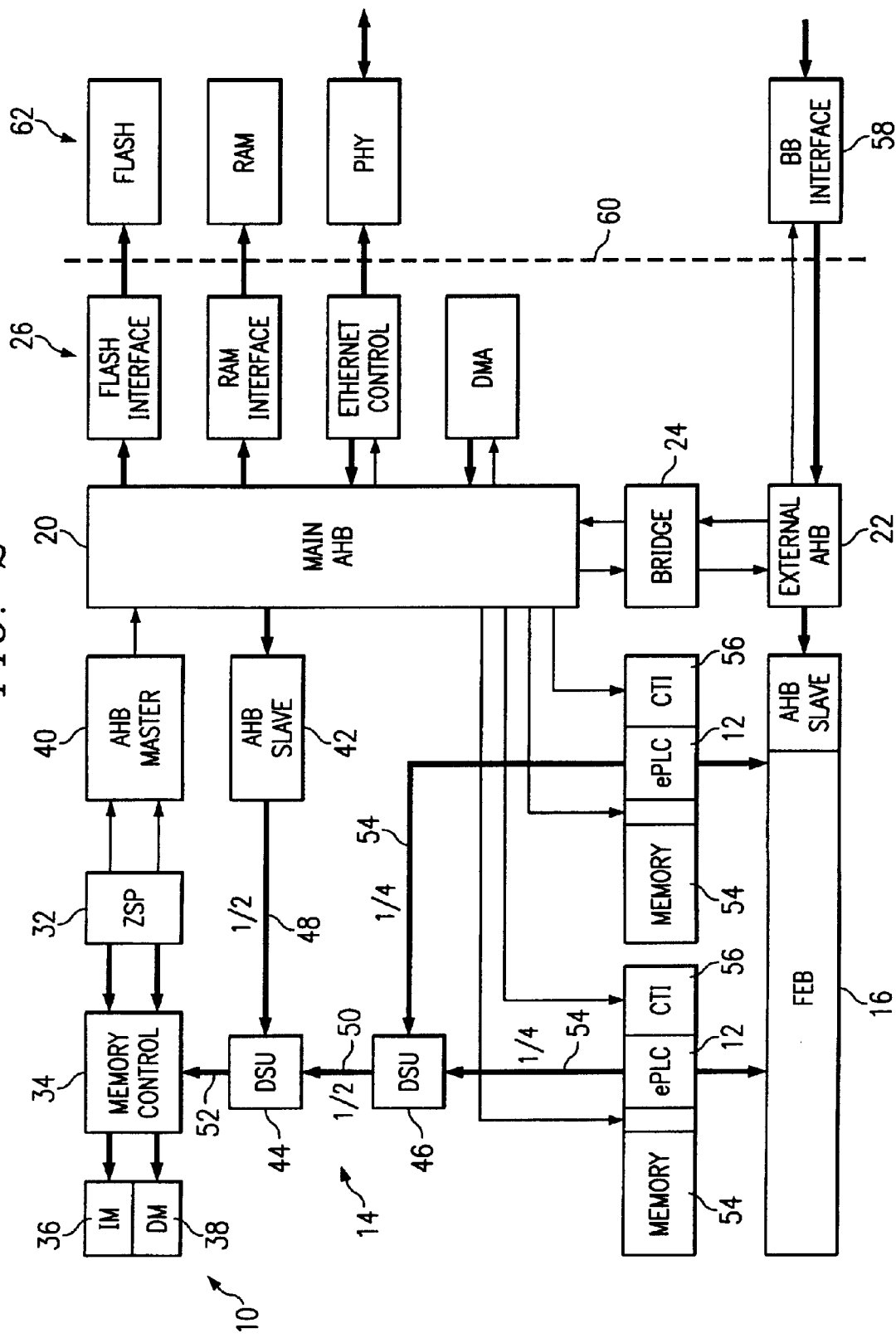
FIG. 2 is a more detailed block diagram of the system of FIG. 1.

With reference to FIG. 2, more details of the system of FIG. 1 are shown and will be described. The DSP subsystem 10 includes a processing core 32, a memory controller (MC) 34, an instruction memory (IM) 36 and a data memory (DM) 38. The DSP 10 system also includes an AHB master interface 40 which couples the DSP 32 to the AHB 20 as a master and an AHB slave interface 42 which couples the DSP 32 to the AHB 20 as a slave. The master interface 40 may be the system disclosed in U.S. patent application Ser. No. 09/847,849 filed Apr. 30, 2001 and assigned to the same assignee as this application, which application is hereby incorporated by reference for all purposes. The slave interface 42 may be the system disclosed in U.S. patent application Ser. No. 09/847,850 filed Apr. 30, 2001 and assigned to the same assignee as this application, which application is hereby incorporated by reference for all purposes.

In FIG. 2, the DSU 14 is shown to be made of two sections 44 and 46 connected in a series or cascade type of arrangement. The section 44 is coupled at 48 to the slave 42, is coupled at 50 to the section 46 and is coupled at 52 to a DMA port of memory controller 34. DSU section 46 is coupled at two inputs 54 to the two PLCs 12 and at 50 to the section 44. The sections 44, 46 time multiplex the connection of PLCs 12 and the slave 42 to the DMA input 52 of memory controller 34, as discussed in more detail below with reference to FIG. 6. As indicated in FIG. 2, the DSU section 46 connects each PLC 12 one-fourth of the time and the DSU section 44 connects the DSU section 46 and the slave bridge 42 one-half of the time. The effect of this connection allocation is that the full bandwidth available at the DMA input 52 is allocated to the three devices, i.e. PLCs 12 and AHB slave 42, accessing the data memory 38.

In FIG. 2, each of the PLCs 12 is shown to include working or scratchpad memories 54 and control sections 56. Each of the memories 54 and control sections 56 has its own AHB connection to bus section 20. These bus connections allow the DSP 32 to reconfigure and control the operation of PLCs 12. This AHB connection between DSP 32 and PLCs 12 is in addition to the connections through DSU 14, and avoids conflict or interference between the high bandwidth data path and the control path. Note however, that the path through AHB 20 can be used for coupling data, and may be useful in outputting the results of processing which normally have a lower bandwidth than the signals received from a broadband interface 58.

In FIG. 2, the external controllers 26 are coupled across dotted line 60 to their corresponding external devices 62. The dotted line 60 represents the boundary between devices implemented on an integrated circuit and the external devices.

With reference to FIG. 2, the overall operation of a signal processing system according to the present invention will be described. Broadband data is received through interface 58 and coupled to FEB 16. It is then coupled to one or both of the PLCs 12 for initial processing. For example, the broadband signals may be encoded video signals. The PLCs may be configured to decode the signals and recover the original transmitted signals. As the PLCs complete their processing task, they write the results into data memory 38. DSP 32 then reads the data from memory 38 and performs further arithmetic processing. If post processing is desired, the DSP 32 may write back to memory 38, from which a PLC 12 can read for the post processing step. When processing is completed, the device performing the last step, i.e. either the DSP or the PLC, couples the results to a desired external device, for example a video screen.

Figure 3:
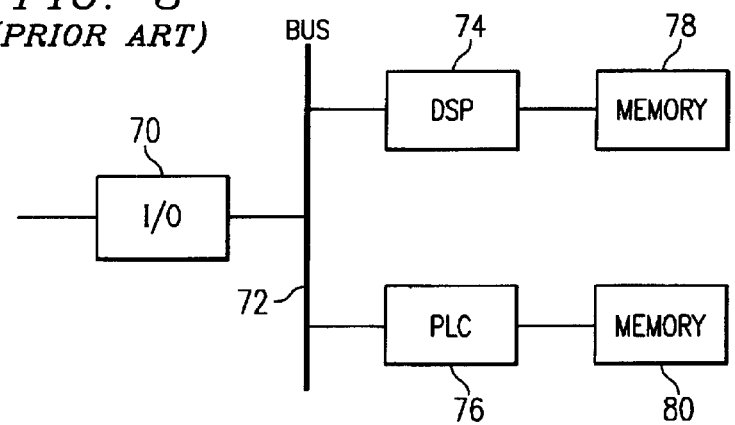
FIG. 3 is a block diagram of a prior art system.

An advantage of the present invention can be seen by consideration of a prior art architecture shown in FIG. 3 which may be used for similar types of signal processing. In FIG. 3, an input output device 70 is shown coupled by a common interface bus 72, e.g. an AMBA AHB, to a DSP 74 and a PLC 76. DSP 74 has closely coupled memory 78. PLC 76 has its own memory 80. In this architecture, data received from I/O 70 is first received by PLC 76 and written into memory 80 for preprocessing. As preprocessing is completed, the results are stored in memory 80. When DSP 74 is ready for the data, it requests the data from PLC 76, which must read the data from memory 80 and transfer it to DSP 74, which must then write the data into memory 78. Both PLC 76 and DSP 74 must be involved in the separate reading and writing steps just to transfer the data to the DSP after preprocessing is completed. Once the data is in memory 78, the DSP can perform its processing steps. The present invention avoids the extra reading and writing steps used in the prior art systems for transferring data. In the present invention, a single memory unit is shared by both the DSP and the PLCs, so that there is no need for a separate data transfer step. The present invention also avoids using a common interface bus on an integrated circuit for high bandwidth data transfers.

Figure 4:
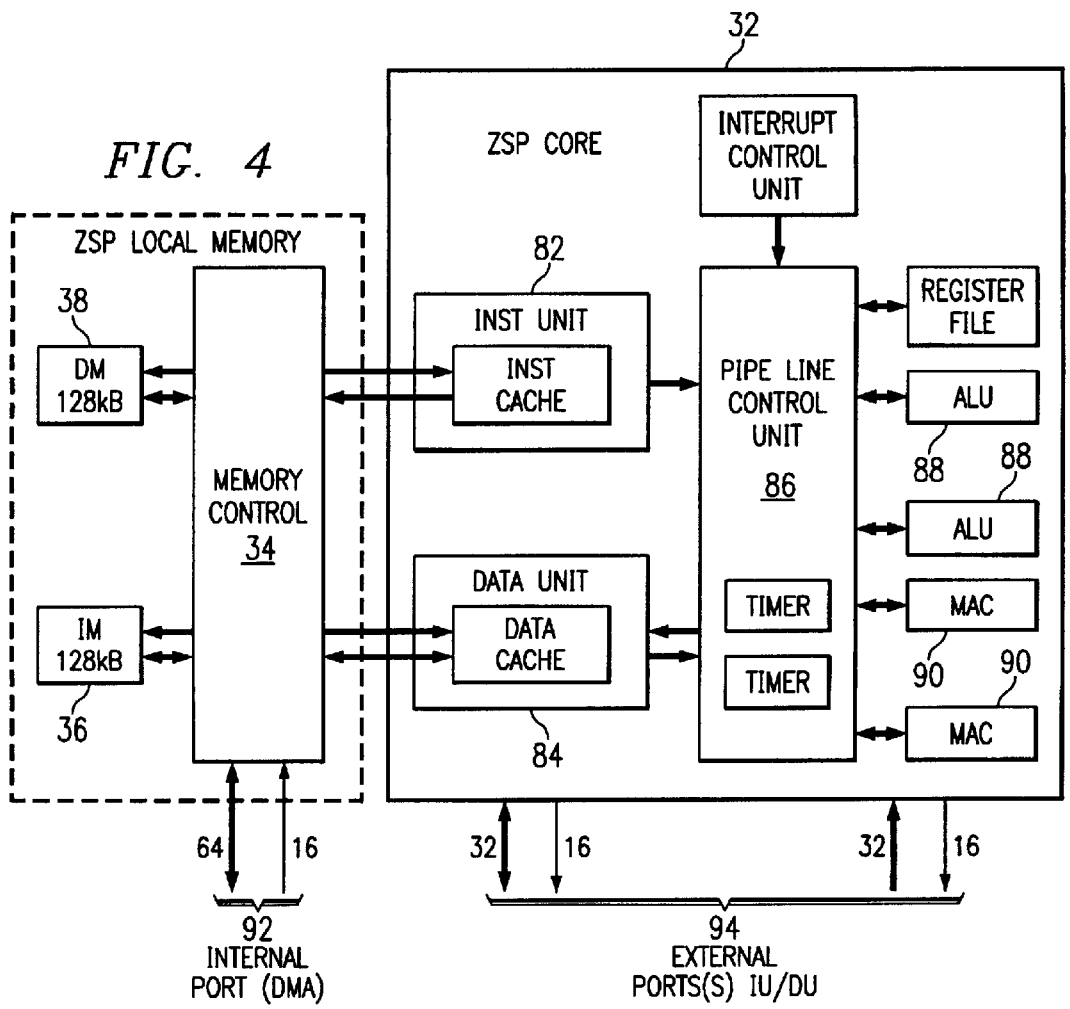
FIG. 4 is a block diagram of the DSP of FIGS. 1 and 2.

With reference to FIG. 4, more details of the DSP 10 of FIGS. 1 and 2 will be described. Parts corresponding to parts shown in FIGS. 1 and 2 are given the same reference numbers in FIG. 4, e.g. memory controller 34, instruction memory 36 and data memory 38. The DSP core 32 includes all of the components within solid line box 32 of FIG. 4. These include an instruction unit 82, a data unit 84, a pipeline controller unit (PCU) 86, two arithmetic logic units (ALUs) 88 and two multiply and accumulate units (MACs) 90.

Instruction and data units 82, 84 manage the memory interface and implement pre-fetching of instruction and data for use by the pipeline controller unit 86 and execution units 88, 90. The instruction unit 82 does instruction pre-fetching and dispatching via a direct-mapped instruction cache in order to present four instructions per cycle to the pipeline control unit 86. The data unit 84 does data pre-fetching, and load/store arbitration and buffering, via a fully associative data cache. Caching is used in the IU 82 and DU 84 to keep the execution units 88, 90 fed with data to maximize the number of instructions executed per cycle.

The pipeline controller unit 86 groups instructions and resolves data and resource dependencies for parallel execution. The PCU 86 schedules instructions for execution by four functional units, i.e. MACs 90 and ALUs 88, and synchronizes pipeline operations, including operand bypass and interrupt requests.

The MACs 90 and ALUs 88 can work independently and concurrently to perform up to four 16-bit by 16-bit operations per cycle. The MAC 90 or ALU 88 resources can be grouped for 32-bit by 32-bit operations or dual 16 bit operations.

The DSP core 32 implements two interface ports for memory and peripherals: an internal port interface 92 for close coupled, single cycle instruction memory 36 and data memory 38; and an external port for IU 82 and DU 84 alternative access to external memory and peripherals. The internal and external ports 92, 94 both contain instruction and data interfaces that support either single ported or dual ported memories. The internal port 92 is coupled to DSU section 44 at its port 52 as illustrated in FIG. 2. The external ports 94 are coupled to AHB master bridge 40 of FIG. 2.

The internal port 92 allows closely coupled "local" memory interfacing and is intended for use with synchronous on-chip memory. The DSP core 32 can simultaneously access internal instruction memory 36 and data memory 38 every cycle in order to provide data and instructions in superscalar operations. Each of the data and program memory ports 92, 94 support 64-bit memory reads and 32-bit writes. The internal port I/0 is non-stallable to facilitate ZSP memory throughput. By using dual ported memory and a memory interface controller 34 that allows multiplexing and segmentation of memory ports, a low overhead Direct Memory Access (DMA) interface to external on-chip logic is implemented. These DMA interfaces allow shared access by the DSP and other logic to local DSP subsystem memory and provide for direct high bandwidth (up to 64 bit) access of external data into the DSP core or conversely direct export of DSP data to external on-chip logic.

The external port 94 interfaces the DSP to external memory and peripherals and provides 16 bit input and 32 bit output data bussing to the core IU 82 and DU 84. The external port 94 interface, unlike the Internal Port interface is fully stallable. The external port is interfaced to the AMBA AHB 20 (FIG. 2) as a bus master, allowing control of all other blocks.

Figure 5:
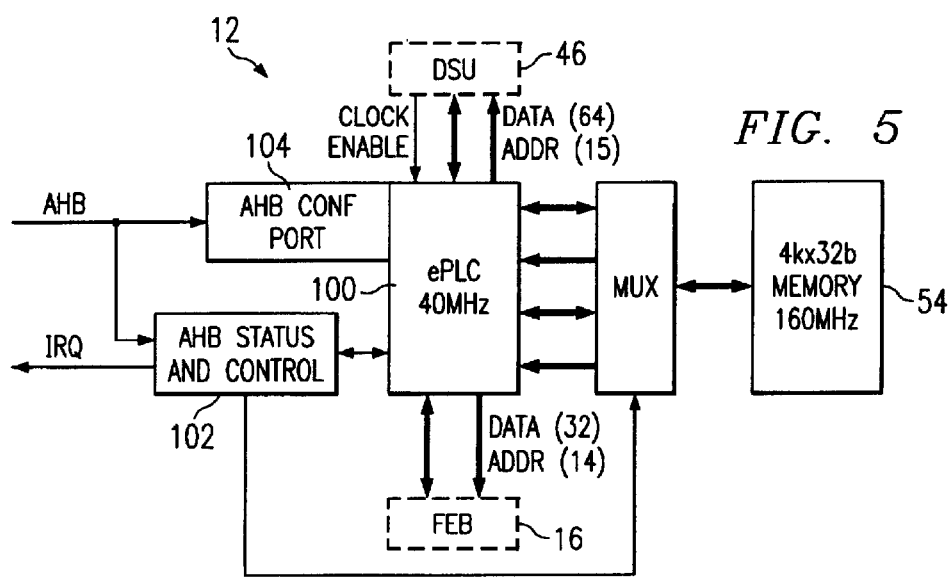
FIG. 5 is a block diagram of a PLC of FIGS. 1 and 2.

With reference to FIG. 5, more details of the PLCs 12 of FIGS. 1 and 2 are provided and will be described. Each PLC 12 includes a multi-scale array (MSA) 100, an application circuit interface (ACI) or status and control port 102, and a PLC adapter or configuration port 104.

The PLCs 12 are intended as loosely coupled co-processors for algorithm acceleration. The PLC 12 architecture is an RTL programmable logic core resource developed specifically for embedded applications. The PLC architecture in this embodiment was developed by Adaptive Silicon Inc. The PLC contains user configurable logic processing resource.

The MSA 100 contains user programmable portions of the PLC and consists of an array of configurable ALU (CALU) cells and their local and hierarchical interconnect and routing resources. The MSA is implemented as a hard-macro.

The application circuit interface (ACI) 102 provides the signal interface between the MSA 100 and the application circuitry and is contained in the same hard-macro as the MSA. In this embodiment, ACIs are used for both DSU and Data buffer interfaces.

The PLC adapter 104 initiates and loads the PLC 12 configuration data and interfaces to test circuitry, clock and reset control through a configuration test interface. PLC adapters integrate to an AMBA AHB slave interface. This allows the PLC programming to be handled over the on-chip AHB from flash or other external memory.

The PLC 12 contains two AHB interfaces. One, integrated with the PLC adapter 104, is dedicated to PLC programming. The other, integrated with the ACI 102, provides for general-purpose communication over the AHB to peripherals and DSP core 32 as needed.

Supporting sufficient on-chip bandwidth is a critical parameter in DSP/programmable logic architectures. The present embodiment uses dual approaches for integration between cores. Both DSP 10 and PLC 12 cores interface to the AMBA AHB bus 18, along with every other significant on-chip logic block. The AHB bus 18 structure contains two AHB bus segments 20, 22 (main and external) divided by the bi-directional AHB-AHB bridge 24. The bus 18 is divided by the bridge to separate high bandwidth on the external segment 22 from low latency control traffic on the main segment 20. Bridging these two types of traffic ensures they will not interfere with each other. The main segment 20 contains 3 AHB masters (DSP, DMA and Ethernet) plus the bridge 24 which can act as master for inter-segment communications. Control and maintenance of logic, including PLC sub-systems 12 is done through the main AHB.

All peripheral communication is handled through the AHB buses, with the external AHB dedicated for high bandwidth interface to system front-end, e.g. PCI, data transfers to a front-end buffer 16 that directly interfaces to the PLC blocks 12.

AMBA does not, however, support levels of processor and accelerator integration desired in broadband processing. To address this, the present invention uses a dedicated DMA/sharing unit (DSU) interface 14 (FIGS. 1 and 2) for multi-word access of DSP internal memory data by both the DSP and PLC blocks. It also provides for direct data transfer between DSP internal ports 92 and PLCs 12. This method separates high bandwidth data transfers and low latency control communication.

Figure 6:
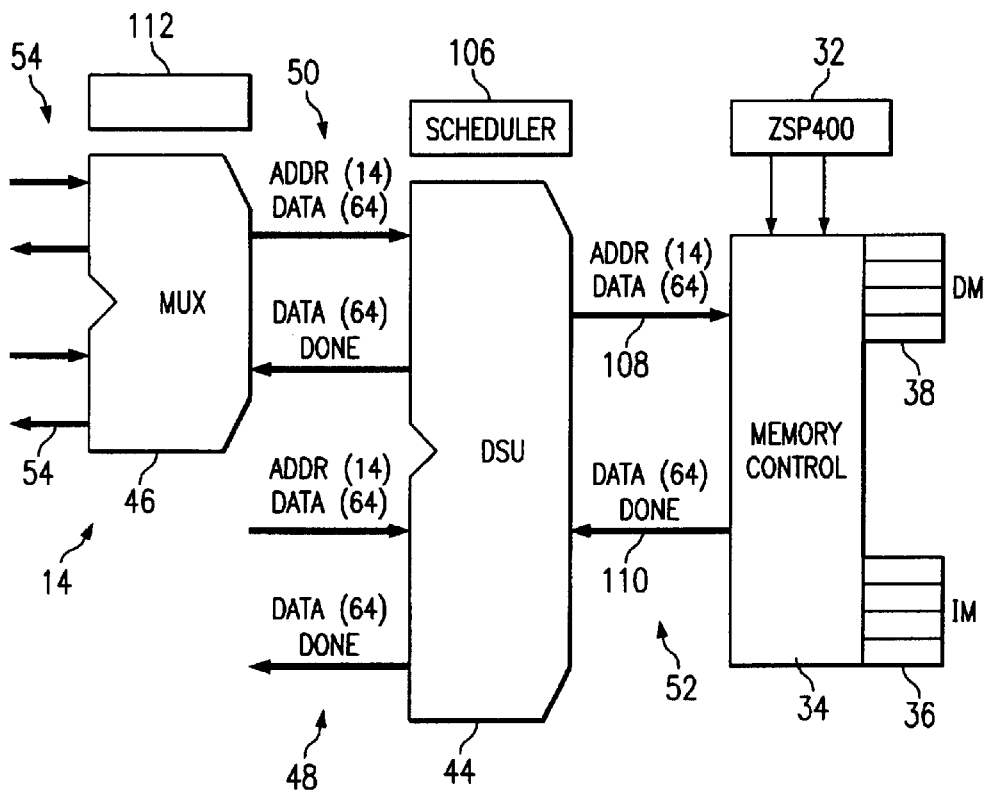
FIG. 6 is a block diagram of a DMA port share unit of FIGS. 1 and 2.

FIG. 6 provides more details of the DSU 14 and other portions of FIGS. 1 and 2. Corresponding parts have the same reference numbers. For example, the DSU 14 of FIG. 1 is shown in FIG. 2 to include two cascaded sections 44, 46 which are essentially identical. As shown in FIG. 6, the DSU 44 also includes a scheduler 106 that shares the DMA port between PLC accelerator sub-systems 12 and AHB slave interface 42, and also handles stalling of data from the PLC blocks when the DSP 32 and PLC subsystem 12 actively access the same memory bank in internal memory 36, 38. Stalls won't occur when separate memory banks are accessed, which is the preferred method.

In FIG. 6, the structure of the ports 48, 50 and 52 of DSU section 44 are shown in more detail. Port 52 includes an address and data bus 108, also labeled ADDR (14)/DATA (64), and a control bus 110, also labeled DATA (64)/DONE. Bus 108 couples an address, a read or write flag and, for a write, data to be written at that address to the memory controller 34. If the request is completed, the control bus 110 provides a DONE=1 on the next clock cycle. If the request in not completed, e.g. because DSP 32 was accessing the same memory bank on that clock cycle, the control bus will indicate DONE=0 and the requesting device must stall and try the operation again.

The DSU 44 is essentially a multiplexor having two ports 48, 50 which are alternately coupled to the port 52. The selection is made by scheduler 106. In this embodiment, the scheduler 106 simply switches between ports 48 and 50 on alternate clock cycles in synchronization with the clock of DSP 32. That is, each of the ports 48 and 50 can operate at half of the bandwidth of DSP 32. The ports 48 and 50 have the same address/data bus and control bus configuration as port 52, since they are coupled through DSU 44 on a one-to-one basis.

The DSU 46 may be identical to DSU 44 and operates in essentially the same way. It includes a scheduler 112 like scheduler 106. The scheduler alternately connects the two ports 54 to the port 50 on a 50/50 duty cycle. Ports 54 have the same address/data bus and control bus configuration as port 50, since they are coupled through DSU 46 on a one-to-one basis. The only operational difference is the clock frequency used by scheduler 112. It operates at half the clock frequency of DSP 32, since the port 50 is coupled to port 52 only half the time. As a result, the ports 54 couple each of the PLCs 12 through DSU section 46 and DSU section 44 to the memory controller 34 one-fourth of the time. Note that the data bus width is 64 bits, which can include four 16-bit bytes or two 32-bit bytes, effectively increasing the bandwidth of transfers between PLCs 12 and the memory controller 34.

Figure 7:
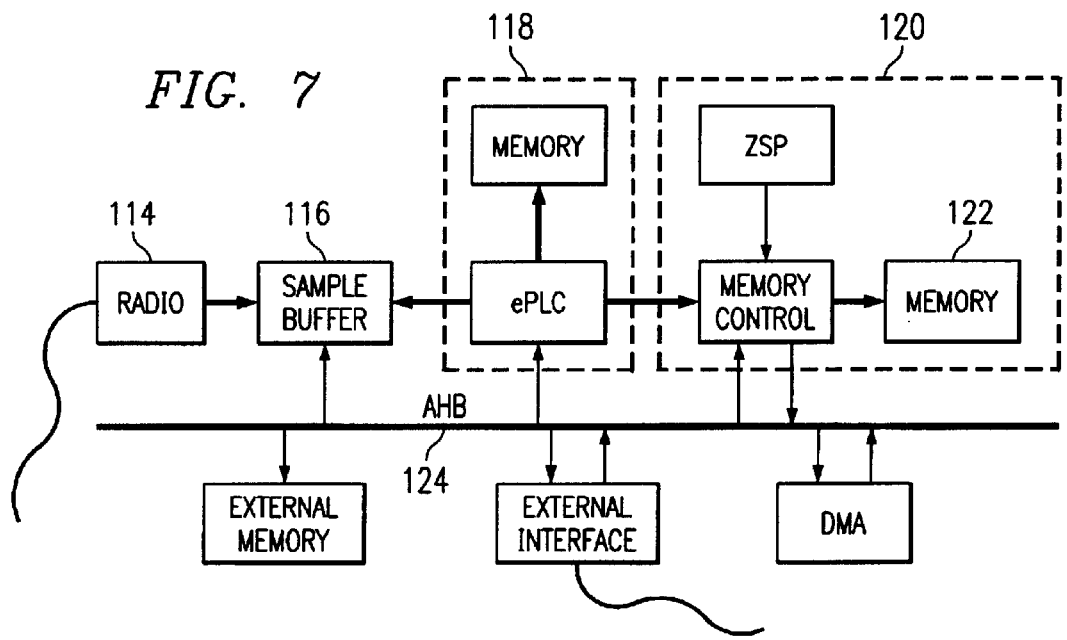
FIG. 7 is a block diagram illustrating intercommunication within an embodiment of the present invention.

In FIG. 7, broadband processing signal flow is illustrated. Data is imported and exported in a batch or streaming mode from a high-throughput buffered interface 114, e.g. a radio receiver. A data buffer 116 simplifies the caching of bursting data on chip. One or more PLC blocks 118 are used to implement a range of pre-processing and data reduction operations. Data is then presented to the DSP subsystem 120, either through shared memory or directly from the DSU for DSP operation. The DSP output data can then be either exported off chip or to the PLC 118 for further post processing (one reason for incorporating 2 PLC blocks) via the shared DSP internal memory 122. While the DSU does not provide a communication channel between the PLC sub systems 118, the PLC systems can communicate via the shared DSP internal memory 122 or FEB 116. It is also possible to move data between PLC systems via DSP controlled AHB 124 traffic.

The amount of data available and used in different processing steps (pre-DSP and post-processing) typically is reduced with each step. As a result, interfaces required for export of processed data (e.g. Ethernet) can have significantly lower bandwidth than those needed during import stages (e.g. PCI).

A number of variations to the present invention may be made. For example, frequencies other than those used in this embodiment may be used. More than two PLCs may be used if desired. For example, four PLCs may be used to allow one pair to perform pre and post processing while a second pair is being reconfigured. In that case, two additional DSU sections may be used to multiplex between the two pairs so that the pair doing actual processing work is connected to the DSP memory 38. The pair being reconfigured does not need that connection, since reconfiguring is done through the AHB bus 20.

As noted above with reference to FIG. 6, the DSP 10 always has priority for accesses to IM 36 and DM 38. Where a conflict occurs, the memory controller 34 returns a control signal, DONE=0, which stalls the requesting device which must then retry on its next allocated access time. MC 34 can access both IM 36 and DM 38 during the same clock cycle, and can likewise access multiple banks in each of IM 36 and DM 38 during the same clock cycle. A conflict will occur only if the DSP 10 is accessing the same bank in the same memory as a PLC or the AHB device is trying to access. That is, both the DSP 10 and a PLC 12 may access IM 36 or DM 38 at the same time if they are accessing different banks.

While the present invention has been illustrated and described in terms of particular apparatus and methods of use, it is apparent that equivalent parts may be substituted of those shown and other changes can be made within the scope of the present invention as defined by the appended claims.

What we claim as our invention is:

1. An integrated circuit comprising:
   a memory,
   a digital signal processor coupled to said memory,
   a first programmable logic core coupled to said memory and to said digital signal processor, and
   a memory controller coupling said digital signal processor to said memory, and coupling said first programmable logic core to said memory and to said digital signal processor,
   said memory controller giving said digital signal processor priority to access said memory when said programmable logic core issues a conflicting memory access request.

2. An integrated circuit comprising:
   a memory,
   a digital signal processor coupled to said memory,
   a first programmable logic core coupled to said memory and to said digital signal processor,
   a second programmable logic core coupled to said memory and to said digital signal processor,
   a first memory access sharing unit coupling said first and second programmable logic cores to said memory,
   said first memory access sharing unit alternately coupling said first and second programmable logic cores to said memory.

3. The integrated circuit of claim 2, further comprising:
   an AMBA AHB bus coupled to said digital signal processor and to said first programmable logic unit.

4. The integrated circuit of claim 3, further comprising:
   an AHB slave device coupling said digital signal processor to said AMBA AHB bus.

5. The integrated circuit of claim 4, further comprising:
   a second memory access sharing unit coupling said AHB slave device and said first memory access sharing unit to said memory.

6. The integrated circuit of claim 5, wherein:
   said second memory access sharing unit alternately couples said AHB slave device and first memory access sharing unit to said memory.

7. An circuit comprising:
   an AMBA AHB bus,
   a digital signal processor having an internal memory and an AMBA AHB port coupled to said AMBA AHB bus,
   a first programmable logic unit having a data port coupled to said digital signal processor internal memory and an AMBA AHB port coupled to said AMBA AHB bus,
   a second programmable logic unit having a data port coupled to said digital signal processor internal memory and an AMBA AHB port coupled to said AMBA AHB bus, and
   a first DMA sharing unit having a first port coupled to the first programmable logic unit data port, a second port coupled to the second programmable logic unit data port, and a third port coupled to the digital signal processor internal memory, and selectively coupling one of said first and second ports to said third port.

8. The circuit according to claim 7, further comprising:
   a clock providing timing signals for operation of said digital signal processor, and
   a first scheduler coupled to said first DMA sharing unit and alternately selecting connection of said first port and said second port to said third port in synchronization with said clock.

9. The circuit according to claim 8, further comprising:
   an AHB slave device coupling said digital signal processor internal memory to said AMBA AHB bus.

10. The circuit according to claim 9, further comprising:
    a second DMA sharing unit having a first port coupled to the first DMA sharing unit third port, a second port coupled to the AHB slave device, and a third port coupled to the digital signal processor internal memory, and selectively coupling one of said first and second ports to said third port.

11. The circuit according to claim 10, further comprising:
    a second scheduler coupled to said second DMA sharing unit and alternately selecting connection of said first port and said second port to said third port in synchronization with said clock.

12. A method of operating an integrated circuit having digital signal processor and a programmable logic core comprising:

using a common memory to store data processed by said digital signal processor and said programmable logic core; and coupling said digital signal processor and said programmable logic core to said memory with a memory controller which gives priority to memory access requests from said digital signal processor when said programmable logic core makes a conflicting memory access request.

13. The method according to claim 12, further comprising:

coupling control signals between said digital signal processor and said programmable logic core with an AMBA AHB.

* * * * *